(No Model.)

J. LUCAS.
DEVICE FOR BREAKING BALKY HORSES.

No. 269,589. Patented Dec. 26, 1882.

Witnesses,
Geo. H. Strong.
D. H. House.

Inventor,
Jos. Lucas
By Dewey & Co.
Attorneys

UNITED STATES PATENT OFFICE.

JOSEPH LUCAS, OF LOS ANGELES, CALIFORNIA.

DEVICE FOR BREAKING BALKY HORSES.

SPECIFICATION forming part of Letters Patent No. 269,589, dated December 26, 1882.

Application filed April 29, 1882. (No model.)

*To all whom it may concern:*

Be it known that I, JOSEPH LUCAS, of the city and county of Los Angeles, State of California, have invented an Improved Device for Breaking Balky Horses; and I hereby declare the following to be a full, clear, and exact description thereof.

My invention relates to a device for breaking or overcoming the fault of horses which refuse to move at times, commonly known as "balky horses."

It consists in the employment of two boots or inclosing pieces of leather, which are fitted around the front legs of the animal, just behind the knees, and have a cord or strap attached to them from the front and passing through a pulley, which is fixed to the front end of the pole, so that when the animal moves properly and freely the strap runs freely back and forth through the pulley with the reciprocal action of the front legs. If, however, the animal refuses to travel, the other animal of the team will start the wagon, and the consequent pull upon the boots will force the unwilling animal to start.

Figure 1:
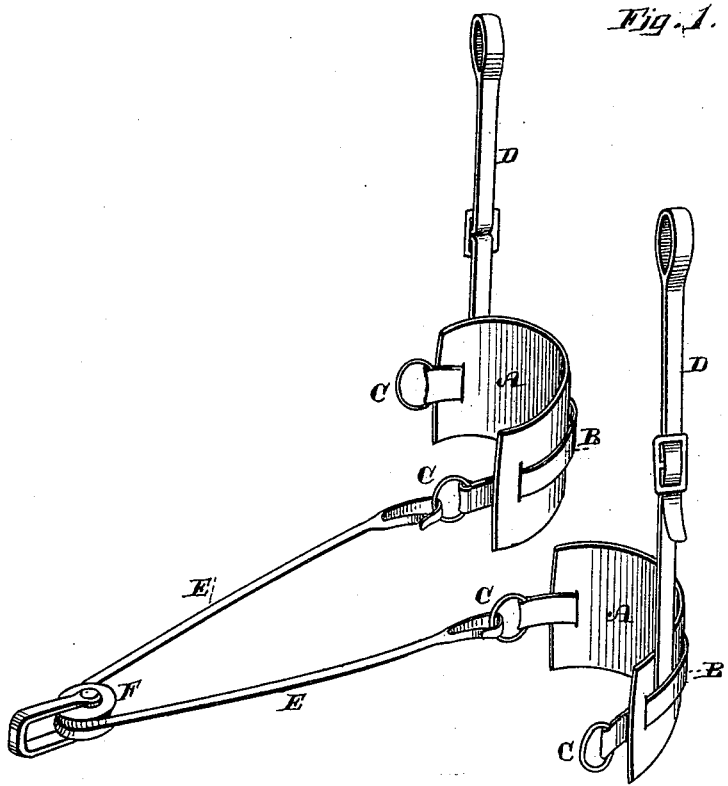
Figure 2:
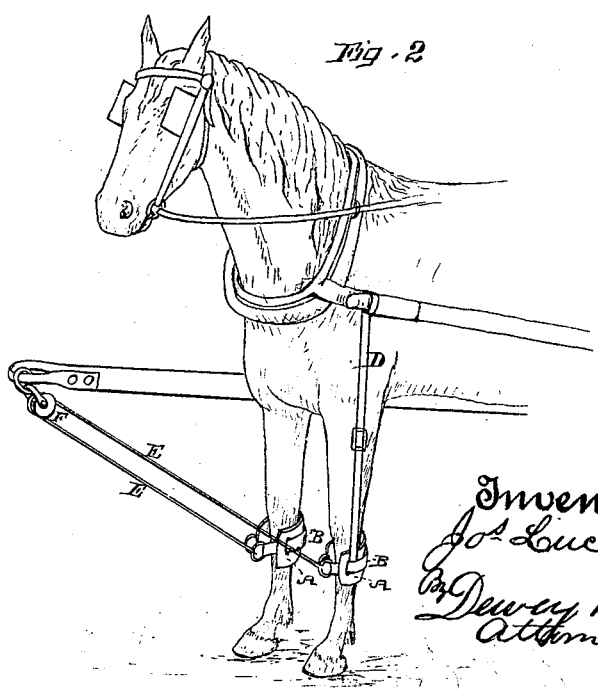

Referring to the accompanying drawings for a more complete explanation of my invention, Figure 1 is a view of my device. Fig. 2 shows its application.

A A are two boots or pieces of leather, fitted to partially or quite inclose a horse's front legs at a point at or near the knees. These boots extend around the rear of the knees, and have straps B extending around to the front, with fastenings C. The boots are supported and kept in place without being fitted too tightly by suspending-straps D, which are fastened to the boots and extend up to the tugs, having a loop through which the tugs may pass. From the fastenings C a strap, E, extends forward to the front end of the pole, where it passes through a pulley, F, returning to the other leg. The pulley F is fastened to the front end of the pole, and the strap E slides back and forward through the pulley with the movements of the horse's front legs, so that when he travels properly it will be no impediment. When, however, he refuses to move, the starting of the other horse causes the pole to pull upon the strap E, and through it upon the horse's front legs from the rear, so that he will be compelled to move them, and thus advance with the vehicle. After a short time the bad habit will be broken or overcome and the horse become much more useful and reliable.

Having thus described my invention, what I claim as new, and desire to secure by Letters Patent, is—

The horse breaking or educating device, consisting of the boots or pieces A, adapted to encircle the front legs of a horse from the rear, at or about the knees, in combination with the strap or cord E, having one end connected with each of the boots and its bight passing through a pulley, F, adapted to be attached to the pole in front of the horse, substantially as and for the purpose herein described.

In witness whereof I hereto set my hand.

JOSEPH LUCAS.

Witnesses:
 JEROME CARESS,
 A. P. BENTLEY.